United States Patent Office 3,172,874
Patented Mar. 9, 1965

3,172,874
ORGANOSILICON POLYUREA COMPOSITIONS AND METHOD FOR PREPARING THE SAME
Johann F. Klebe, Schenectady, N.Y., assignor to General Electric Company, a corporation of New York
No Drawing. Filed Apr. 15, 1964, Ser. No. 360,105
17 Claims. (Cl. 260—77.5)

This invention is concerned with polysilylureas, their preparation, their conversion to polyureas, and intermediates used to make these polysilylureas. More particularly the invention relates to a process for making polysilylureas which comprises effecting reaction between a diisocyanate of the formula (I)  OCN—R—NCO with a triorganosilylamine of the formula (II) 

where R is a divalent organic radical, R' is a monovalent hydrocarbon radical, R'' is a member selected from the class consisting of hydrogen and monovalent hydrocarbon radicals, and the grouping (III) 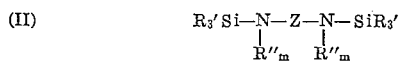

is a divalent organic radical selected from the class consisting of (a) organic radicals terminated by two nitrogen atoms with Z being a divalent organic moiety, and (b) alicyclic radicals in which Z with the two nitrogens forms a cyclic diamine structure, and $m$ is a whole number from 0 to 1, $m$ being zero only when the aforesaid grouping is alicyclic. The invention also includes polysilylureas (hereinafter so designated) of the formula (IV) 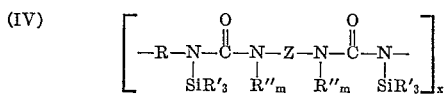

where R, R', R'', Z and $m$ have the meanings above and $x$ is a whole number in excess of 1, for instance from 10 to 10,000 or more and as high as 100,000 or higher; and the conversion of these polysilylureas to polyureas (hereinafter so designated) of the formula (V) 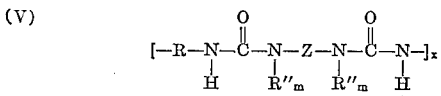

where again R, R'', Z, $m$ and $x$ have the meanings given above, the said polyureas being formed by the hydrolysis of the polysilylurea to remove the —SiR'$_3$ groups to form the polyureas and disiloxanes of the formula (VI)  R'$_3$—O—SiR'$_3$ where R' has the meaning given above.

Finally the invention includes compositions of the formula (VII) 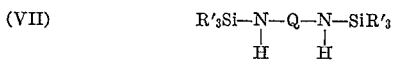

where R' has the meaning above and Q is a divalent aryl radical selected from the class consisting of phenylene, xenyl, diphenylene oxide, and diphenylene alkanes of the formula

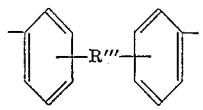

where R''' is a divalent alkyl radical, e.g., methylene, isopropylidene, etc.

Polyureas of Formula V are generally obtained by condensing at elevated temperatures a diisocyanate with a diamine of the formula (VIII) 

where R'', Z and $m$ have the meanings given above. Such condensations require elevated temperatures and fairly long periods of time. Even after the condensation has taken place to form the polyureas, extensive processing is required to obtain the polyurea in pure form.

I have unexpectedly discovered that I am able to obtain polyureas at room temperatures in relatively short periods of time and often in a matter of minutes; moreover the polyureas thus obtained require a minimum of processing for maximum purity. The attainment of these objectives in making the polyureas is based on the preparation of a polysilylurea precursor of Formula IV, which can be readily hydrolyzed to form the polysilylurea and the disiloxane of Formula VI. This disiloxane can either be volatilized from the polyurea or can advantageously be used, for instance, when forming films or fibers, to induce water repellency of the final polyurea article. In preparing the polyureas, I first prepare a polysilylurea of the Formula IV from the reaction of a diisocyanate of Formula I with a triorganosilylamine of Formula II. In general the reaction of the silyl-substituted diamine of Formula II and the diisocyanate are carried out in the presence of a solvent at temperatures preferably somewhat in excess of room temperature for a sufficient time until the polysilylurea is formed, and thereafter the polysilylurea is separated and can then be converted to the polyurea by subjecting it to hydrous conditions, e.g., by treating with an atmosphere containing water.

Among the divalent (both substituted and unsubstituted) organic radicals which R may be are, for instance, alkylene radicals (e.g., ethylene (—CH$_2$CH$_2$—), propylene, methylethylene [—CH$_2$—CH(CH$_3$)—], amylene including all of its isomeric forms, butylene including all of its isomeric forms, etc.); arylene radicals (e.g., phenylene, biphenylene, naphthylene, etc.); aralkylene radicals (e.g., naphthylethylene, phenylethylene, etc.); alkarylene radicals (e.g., tolylene, xylylene, etc.); aryl ether radicals (e.g., radicals of the formula

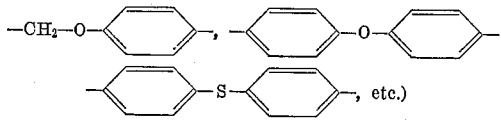

etc.). Where R is an arylene radical, any substituents thereon can be in any of the positions vicinal, symmetrical and asymmetrical to the valences of the arylene radical connected to the isocyanate (—NCO) radicals. The valences of the arylene group may be varied in ortho-, meta-, or para-positions with the meta- or para-positions being the preferred arrangement.

Among compositions which the diisocyanates of Formula I may be are, for instance, ethylene diisocyanate, butylene diisocyanate, pentamethylene diisocyanate, phenylene diisocyanate, toluene diisocyanate, naphthalene diisocyanate, (where the isocyanato groups may be alpha or beta-substituted on the same or different aryl rings of the naphthalene nucleus) xylene diisocyanate; p,p'-diisocyanato diphenyloxide; para,para'-diisocyanato diphenylmethane, etc. The presence of inert substituents on the aryl nucleus of aryl diisocyanates, for example, halogens (e.g., chlorine, bromine, etc.), nitro group, cyano group, ester groups, as well as other hydrocarbon radicals such as alkyl, aryl, aralkyl and alkaryl radicals, is not precluded. It is essential that there be no substitution on the R group of reactive groups, such as an amine, a hydroxy, a carboxy, or similar reactive atoms or group. Z in the grouping

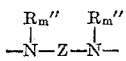

may be any of the divalent organic radicals, for instance, saturated aliphatic hydrocarbon radicals of acyclic nature mentioned above for R, e.g., ethylene, propylene, methylethylene, butylene, hexamethylene, etc. In addition, when Z with the two nitrogens in a cyclic organic radical containing the nitrogen in the ring structure such groupings can be, for example, the piperazyl radical of the formula (IX)
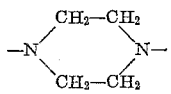

substituted piperazyl radicals as, for instance, alkyl-substituted derivatives, e.g., monomethyl- and dimethyl-substituted piperazyl radicals in which the alkyl groups, e.g., the methyl groups, can be ortho, meta, or para to each other or, if more than two alkyl groups are present, they can be symmetrical, asymmetrical or vicinal in their relationship to each other. Such compositions would have the formula (X)
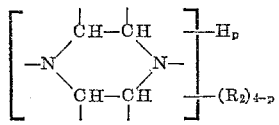

where $R_2$ is a monovalent hydrocarbon radical such as those recited for R' (intra), and $p$ is a whole number from 0 to 4, inclusive. With respect to Z alone, when it is part of a cyclic radical containing the two nitrogen atoms, Z can be, for instance, the divalent ethylene radical, both the methylene radical and the higher alkylene radicals, such as the pentamethylene radical when the two nitrogens are closer together in the ring, etc. Furthermore, it should be recognized that $m$ is 1 only when the grouping of Formula III is acyclic, while $m$ is 0, only when the latter grouping is cyclic in nature.

Among the radicals which R' and R'' may be are, for instance, alkyl radicals (e.g., methyl, ethyl, propyl, isopropyl, pentyl, octyl, dodecyl, etc., radicals); aryl radicals (e.g., phenyl, naphthyl, biphenyl, etc., radicals); aralkyl radicals (e.g., benzyl, phenylethyl, etc., radicals); alkaryl radicals (e.g., xylyl, tolyl, ethylphenyl, methylnaphthyl, etc., radicals); cycloaliphatic (including unsaturated) radicals (e.g., cyclopentyl, cyclohexyl, cyclopentenyl, cyclohexenyl, etc., radicals); unsaturated acyclic aliphatic radicals (e.g., vinyl, allyl, methallyl, etc., radicals); etc. The presence again of inert substituents (i.e., inert to the reactants and the reaction product) on the organic radicals as, for instance, halogen groups, the nitro group, etc., is not precluded. R'' can be hydrogen or a monovalent hydrocarbon radical the same as those recited for R'.

The triorganosilyl diamines of Formula II can be prepared by reacting a diamine of Formula VIII with a triorganohydrolyzable silane of the formula $$R'_3Si—X$$

where R', R'', Z, and $m$ have the meanings given above, and X is a halogen, for example, chlorine, bromine, fluorine, etc. Among the triorganohydrolyzable silanes which may be employed are, for instance, trimethylchlorosilane, triphenylchlorosilane, methyldiethylbromosilane, tritolylbromosilane, triethylchlorosilane, tribenzylchlorosilane, etc.

Among the acyclic diamino compounds and cyclic dinitrogen compounds of Formula VIII which may be prepared to make the triorganosilyl diamines of Formula II are, for instance, ethylenediamine, N,N'-dimethylpropylene diamine, phenylenediamine, toluenediamine (where the diamino groups may be ortho, meta, or para), N,N'-diphenylethylenediamine, N - methyl-N'-phenyl-ethylene diamine, N,N' - dibenzylhexamethylenediamine; substituted piperazines, such as methyl and dimethyl-substituted piperazines (e.g., methylpiperazine; 2,5-dimethyl-piperazine, cyanopiperazine, diketopiperazine), pyrazolidine, pyrazolidone, 3-pyrazoline; 2,5-diamino-1,3-pyrimidine; p,p' - diaminodiphenyl; p,p' - diaminodiphenyloxide; o,o'-diaminodiphenylmethane, etc.

In making the triorganosilyl amines of Formula II, a molar ratio of at least 2 and up to 6 or more mols of the trihydrocarbon substituted hydrolyzable silane of formula R'$_3$Si—X is reacted with 1 mol of the diamino composition of Formula VIII, preferably in the presence of a non-polar solvent such as benzene, toluene, xylene, dioxane, etc., under anhydrous conditions at temperatures from slightly above room temperature up to the reflux temperature of the mass. The triorganohydrolyzable silane, such as, trimethylchlorosilane, is added to the diamino compound, in the presence of a hydrohalide acceptor such as, pyridine, triethylamine, etc. or some other tertiary amine usually results in an exothermic reaction with the temperature rising as high as 40–70° C. The mixture of ingredients is advantageously stirred for a period of from about one half to two hours and thereafter heated at the reflux temperature of the mass for an additional period of 15 minutes to 1 hour and the hydrohalide of the hydrohalide acceptor is then filtered off and the reaction product thereafter fractionally distilled to obtain the desired triorganosilyl amine of Formula II.

In order to form the polysilylurea, the diisocyanate is then reacted with the triorganosilylamine of Formula II employing a molar ratio of about 1 mol of the triorganosilylamine per mol of the diisocyanate. The mixture is then advantageously heated under anhydrous conditions at a temperature of from about 75–150° C., advantageously in a non-polar solvent, examples of which have been mentioned above, and in the presence of an inert atmosphere for periods of time ranging from about 2–5 hours or more. There is thus obtained a solution of the desired polysilylurea which can be precipitated from the solvent by the addition of a non-solvent for the polysilylurea, such as n-hexane.

Solutions of polysilylurea of Formula IV in solvents such as benzene, toluene, tetrahydrofuran, etc., can be used to cast tough, clear, colorless films. The solutions also may be used to spin fibers of the polysilylurea through spinnerettes and volatilizing the solvent. Polysilylureas of Formula IV have molecular weights ranging from 1000 to 500,000 or more. Depending on the substituents which R, R'' and Z, and $m$ represent, many of such polymers will have softening points of around 175–250° C. or higher. By exposing these polysilylureas (e.g., as films, fibers, etc.) to hydrolysis, the polysilylureas can be converted to the unsilylated polyureas of Formula V having good heat and solvent resistances.

The formation of the polyurea containing fewer silyl groups than the starting polysilylurea, or a polyurea completely free of silyl groups, can be accomplished by exposing the polysilylurea to air, preferably of from 70 to 100% relative humidity. This effects hydrolysis of the triorganosilyl groups to form the corresponding disiloxane with the substitution of a hydrogen atom in place of the triorganosilyl group on a nitrogen atom. Where the polysilylurea is fairly thick in cross-section, the scission of the triorganosilyl groups by hydrolysis is more rapid at the surface than in the matrix of the polysilylurea article. Washing the solutions of the polysilylurea with water will effect essentially complete removal of the triorganosilyl groups. After hydrolysis with the moisture or water-containing environment, the disiloxane is removed from the polyurea by washing with suitable solvents or by heating at temperatures high enough to volatilize the disiloxane.

If desired, the conversion of the polysilylurea of Formula IV to a polyurea of Formula V may be effected by using a diamine as the hydrolyzing agent in a solvent of sufficiently high polarity to maintain the polyurea in solution, e.g., dimethyl sulfoxide, dimethyl formamide, etc. By using the diamine as the hydrolyzing agent, it is converted directly into a disilyl diamine which can then be used to make additional polysilylureas by reaction with the appropriate diisocyanate.

The following examples are illustrative of the invention and are not intended to be limiting. All parts are by weight unless otherwise stated. Where analyses are shown, the values in parentheses are the theoretical values.

*Example 1*

The compound N,N'-bis(trimethylsilyl)-p,p'-diaminodiphenyl ether having the formula (XI)

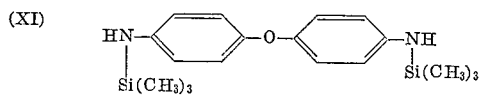

was prepared by suspending 164 grams of p,p'-diaminodiphenyl ether in a mixture of 1.5 liters of dry benzene and 250 grams of triethyl amine (as the hydrohalide acceptor). While agitating the mixture and maintaining anhydrous conditions, 180 grams of trimethylchlorosilane was added to the mixture thereby causing the temperature of the mixture to rise to about 60° C. After 2 hours of stirring, the mixture was heated at the reflux temperature of the mass for an additional hour, the triethylamine hydrochloride formed was filtered off, and the filtrate fractionally distilled to yield a composition boiling at 196–197° C./1.4 mm. pressure; on recrystallization from dry n-hexane, the compound melted at 72–73° C. Analysis showed it to be the compound of Formula XI: Percent C, 63.0 (62.7); percent H, 8.0 (8.2); percent N, 8.0 (8.1); percent Si, 16.3 (16.3).

*Example 2*

Under anhydrous conditions, 3.84 grams (0.02 mol) toluene-2,4,-diisocyanate was mixed with 6.89 grams (0.02 mol) of the silylated amino compound of Example 1, to form a colorless resin which was dissolved in 10 grams dry toluene. The solution was heated with stirring at 100° C. under an atmosphere of dry nitrogen for 3 hours to give a highly viscous solution. 10 cc. of toluene were added and the stirring at 100° C. was continued for another 12 hours. The solution was then diluted with 100 cc. dry toluene and mixed with 30 cc. dry n-hexane, to precipitate a clear, colorless resin soluble in toluene and tetrahydrofuran. This polymer which began to soften around 200° C. was composed of recurring units of the structure (XII)

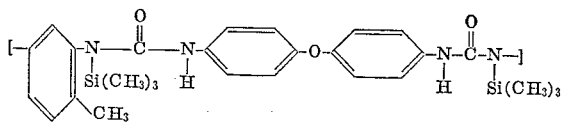

Analysis of the polymer showed it to be the compound of Formula XII as evidenced by the following analytical results:

|    | Found, percent | Theoretical, percent |
|----|---------------|----------------------|
| C  | 62.7          | 62.5                 |
| H  | 6.7           | 6.6                  |
| N  | 11.1          | 10.8                 |
| Si | 10.8          | 10.8                 |

Five samples of films of the polymer ranging from 1.15 to 1.36 mils in thickness when treated for dielectric strength were found to have an average peak of 9.0 kv. per mil as contrasted to a peak of 7.9 kv. per mil for 1.08 mil polyethylene terephthalate film (Mylar film manufactured by Du Pont). These films had a tensile strength of about 6485 p.s.i. Exposure of the polysilylurea to moist air gave a solid polyurea of recurring units of the formula (XIII)

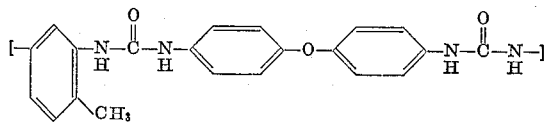

This polyurea, which could be heated at temperatures up to almost 260° C. before any evidence of decomposition, was resistant to most solvents, although soluble in such solvents as dimethyl formamide. Films and fibers were useful as electrical insulation and for high temperature cloths, respectively, could be cast or spun from solutions of this polyurea in dimethyl formamide.

*Example 3*

N,N'-bis(trimethylsilyl)-m-phenylenediamine was prepared by dissolving 108 grams (1 mol) m-phenylenediamine and 300 grams of triethylamine (as a hydrohalide acceptor) in 1 liter of dry toluene, and the mixture of ingredients heated to the reflux temperature of the mass. While at this temperature and under anhydrous conditions, 230 grams (2.1 mols) trimethylchlorosilane was added slowly over a period of about 30 minutes and the mixture then heated at its reflux temperature for about 2 hours. The triethylamine hydrochloride which precipitated was removed by filtration and the product was fractionally distilled to give a silylated amine having the formula:

(XIV)

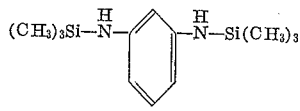

This compound had a boiling point of 130° C./3.5 mm. and a refractive index $n_D^{20.5}=1.5266$.

*Example 4*

When equal molar proportions of the silylated diamine of Formula XIV and of hexamethylene diisocyanate were reacted similarly as was done in Example 2 and the reaction mixture additionally heated for 12 hours at 65° C. (instead of at 100° C.), and thereafter the product was worked up in the same manner as in Example 2, a solid (at room temperature) polysilylurea was obtained composed of recurring units of the formula (XV)

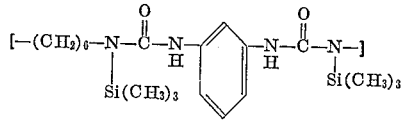

The identity of this polymer was established by the following analyses: Percent C, 57.1 (57.1); percent H, 8.5 (8.6); percent N, 13.1 (13.3). This polymer was soluble in solvents such as benzene, toluene, tetrahydrofuran, dioxane, etc., and could be readily precipitated from solution by aliphatic solvents such as n-hexane.

*Example 5*

The compound N,N' - bis(trimethylsilyl)-p-phenylene diamine of the formula (XVI)

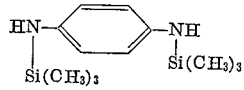

was prepared similarly as in Example 3 with the exception that para-phenylenediamine was substituted for the meta-phenylenediamine of Example 3. The diamine of Formula XVI, when recrystallized from dry n-hexane had a melting point of 103–105° C., and showed the following analyses; the values in parentheses (as will be the case in succeeding examples) are the theoretical values: Percent C, 57.3 (57.1); percent H, 9.7 (9.6); percent N, 11.1 (11.1); percent Si, 22.2 (22.3).

*Example 6*

To a mixture of 5.05 grams (0.02 mol) N,N'-bis(trimethylsilyl)-p-phenylenediamine and 3.20 grams (0.02 mol) para-phenylenediisocyanate was added 10 cc. of dry benzene. The reaction mixture was heated with stirring at 90° C. under a nitrogen blanket. After 2 hours at this temperature, the mixture became quite viscous, after which 10 cc. of dry benzene was added and heating continued at 90° C. for 3 more hours. The viscous solution thus obtained was diluted with 50 cc. dry benzene, and the polymer precipitated as white fibers by the addition of dry n-hexane. This polymer when dried under vacuum under anhydrous conditions, was a polysilylurea composed of recurring units of the formula.

(XVII)

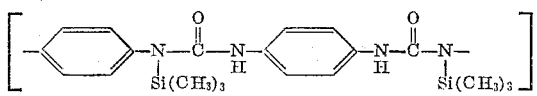

as shown by the following analyses: percent C, 58.0 (58.2); percent H, 7.1 (6.8); percent N, 13.4 (13.6); percent Si, 13.7 (13.6).

*Example 7*

In this example, N,N'-bis(trimethylsilyl)-p-phenylene diamine was reacted with toluene diisocyanate in the same manner as was done in Example 6, and the polymer thereby obtained was isolated in the manner to give a solid product composed of recurring units of formula (XVIII)

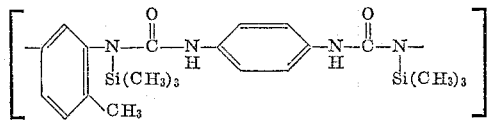

This polymer was soluble in benzene, toluene, dioxane, and tetrahydrofuran. Films therefrom had a tensile of about 5845 p.s.i.

*Example 8*

To illustrate the importance of the silyl substitution on the organic diamine, toluene-2,4-diisocyanate was reacted with para-phenylene diamine in the same manner as was described in Example 7. For solubility reasons, this reaction was carried out while the ingredients were dissolved in N-methyl pyrrolidone. On heating the ingredients, a low molecular weight product (below 10,000) precipitated immediately and this product was found to be insoluble in all common solvents such as benzene, toluene, tetrahydrofuran, etc., and only slightly soluble in boiling N-methyl pyrrolidone. This should be contrasted with the solubility of the polysilylurea of Example 7 which was soluble in a variety of solvents, a property which is essential for the formation of high molecular weight films and fibers.

*Example 9*

Employing the same conditions of reaction and polymer isolation as were used in Example 6, equal molar proportions of toluene-2,4-diisocyanate and N,N'-bis(trimethylsilyl) piperazine (formed by the reaction of trimethylchlorosilane and piperazine employing the conditions described in Example 1) were combined to give a solid polysilylurea compound of recurring units of the formula (XX)

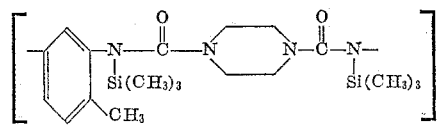

*Example 10*

The compound N,N'-bis(trimethylsilyl)-p,p'-diaminodiphenyl is prepared by forming a suspension of 184 grams of p,p'-diaminodiphenyl in 1.5 liters of dry benzene with 250 grams triethylamine, adding 220 grams trimethylchlorosilane, and heating the mixture of ingredients in the same manner as in Example 1. This will yield a composition having the formula (XXI)

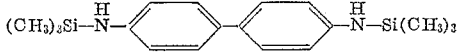

*Example 11*

The compound N,N'-bis(trimethylsilyl)-p,p'-diaminophenylmethane is prepared similarly as in Example 1 that the diaminodiphenyl ether is replaced with 196 grams p,p'-diaminodiphenylmethane and 220 grams rather than 180 grams of trimethylchlorosilane is employed. The product isolated as a result of carrying out the reaction melts at 52–54° C., and has the formula (XXII)

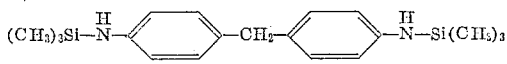

as evidenced by the analyses; percent C, 66.5 (66.3); percent H, 8.9 (8.9); percent N, 8.5 (8.3); percent Si, 16.8 (16.6).

Compounds of the general Formula VII have uses in making the polysilylureas of Formula IV and ultimately polyureas of Formula V. In addition, they can be used to make polyimides of the type disclosed in Boldebuck et al. application Serial Number 359,928, filed concurrently herewith and assigned to the same assignee as the present application.

Similar polysilylureas of Formula IV similar to those described in the foregoing examples can be prepared with the exception that instead of the trimethylsilyl groups, for example, triethylsilyl groups, triphenylsilyl groups, etc., can be present on the nitrogen in place of the trimethylsilyl groups. Included among such compositions used as starting materials are those having triorganosilyl piperazine substitutions in which all methyl groups are substituted by either all ethyl groups or by all phenyl groups.

Since it is believed that in those cases when nitrogen is not part of a cyclic nitrogen containing groups such as piperazyl, triorganosilyl groups attached to the nitrogens of alicyclic radicals may be in equilibrium with the most adjacent nitrogen-bonded hydrogen in the aforesaid recurring unit of Formula IV (where R" is hydrogen), there may be an equilibrium relationship set up so that some or most of the polysilylureas may in some instances instead be composed of recurring units of the formula (XXIII)

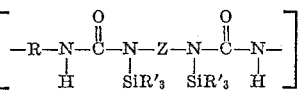

where R, R', and Z have the meanings given above; and as a specific instance may have the formula (XXIV)

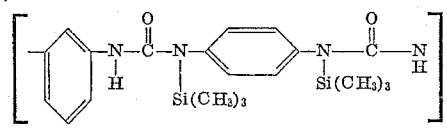

The polysilylureas of the foregoing examples, upon subjecting them to hydrolysis by exposing them to a high humidity atmosphere particularly when in the form of films or fibers, did not show any visible changes in either their appearance, their clearness, or their shape. It was noted that when the silyl substituents on the polysilylurea are trimethylsilyl groups, the resulting silanol (which eventually condenses to the hexamethyl disiloxane) is sufficiently volatile to evaporate as fast as it is formed. In the case of the formation of higher boiling silanols, for instance, where the triorganosilyl group is for instance triethylsilyl, triphenylsilyl, etc., the films take on an oily appearance during hydrolysis and this can be removed by suitable solvents. After hydrolysis the polymers are insoluble in non-polar solvents and only solvents like N-methyl pyrrolidone, dimethyl formamide and dimethylsulfoxide will dissolve the polyureas obtained.

One of the features of this invention lies in the fact that highly aromatic silyl substituted polyureas can be prepared in low boiling, non-polar solvents, and polymers can easily be obtained in the desired form of films, coatings, fibers, etc., by evaporation of the solvents and thereafter exposure to the atmosphere (or to high humidity conditions) to convert the silyl-substituted polymer to the corresponding unsubstituted polyurea. These polyureas have good heat stability, are infusible, and insoluble in all and to common organic solvents.

It will of course be apparent to those skilled in the art that in addition to the conditions or intermediate ingredients which were employed above for making the polysilylureas and the polyureas, other conditions and ingredients can be employed without departing from the scope of the invention. The particular diisocyanate used and the particular triorganosilyl diamine employed can be varied widely as many of the examples which have been given above indicate.

It should be recognized that both the polysilylureas and the polyureas derived therefrom will undoubtedly have a terminal group. Although I do not wish to be bound by this understanding, nevertheless, it is believed that at least one of the terminal groups, whether it be a polysilylurea chain or a polyurea chain, is of the formula

where one valence of the nitrogen is attached to the urea chain while the other valence of the nitrogen is satisfied by either a triorganosilyl group or a hydrogen atom, depending on whether one is dealing with a polysilylurea or a polyurea. As a general proposition the polysilylureas are believed to be terminated by groups of the formula

where R' has the meanings given above; whereas in the case of the non-silylated ureas, the polymer chain is terminated by an amino ($-NH_2$) group. Conceivably, for instance, usually under conditions of incomplete hydrolysis, the polyurea could have one terminal amino group and one group of the formula

The polymers herein disclosed and claimed, particularly the polyureas, are difficultly soluble in most solvents. They can be dissolved readily in dimethyl formamide, dimethyl sulfoxide, etc., to form solutions which can be cast into films by evaporation of the solvent. Films made from upon polyureas free of triorganosilyl groups have utility for packaging and protective applications. They have high tensile strengths and are extremely flexible even at temperatures well above 125° C. Films of these polyureas can also be used as slot liners in motors; and can also be employed as insulation for insulated conductors.

The polyurea composition herein disclosed may also be used as flexible or rigid diaphragms which are resistant to moisture and solvents. Suitable solvent-resistant hose and flexible tubing may be prepared by extrusion methods. The composition may also be mixed with other polymers, for instance, polyamide resin, Buna-N-rubbers, etc., to make products useful as wire insulation.

Various fillers and modifiers may be added to the polysilylureas or the polyureas upon which may be mentioned, for instance, carbon black, zinc oxide, aluminum oxide, celite, asbestos, magnesium carbonate, mica, glass, etc. Such fillers may be added in amounts ranging, by weight, from 0.1 to 200 parts of filler per parts of polymer. Suitable plasticizers may be added as may extenders of resins, for example, cumar, indene, and cumarindene resins.

When extending solutions of the polysilylureas into a humidified atmosphere in order to effect desilylation, i.e., removal of triorganosilyl groups, the fact that triorganosilyl groups form silanol groups which can then condense to form disiloxane may be an advantage in fiber formation because the fiber if coated with such a disiloxane of sufficiently high molecular weight so it does not volatilize readily, can be used to make various cloths, fabrics, and other woven articles which already have a water repellent film of the disiloxane thereon. Thus, one is able to make use of essentially all of the atoms in the polysilylurea in the formation of useful polyureas.

What I claim as new and desire to secure by Letters Patent of the United States is:

1. A polymeric composition composed of recurring units of the formula

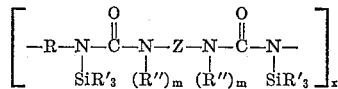

where R is a divalent organic radical, R' is a monovalent hydrocarbon radical, R'' is a member selected from the class consisting of hydrogen and monovalent hydrocarbon radicals, and the grouping

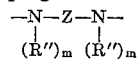

in the recurring unit is a divalent organic radical selected from the class consisting of (a) organic radicals terminated by the two nitrogen atoms with Z being a divalent organic moiety, and (b) alicyclic radicals where Z with the two nitrogens forms a cyclic diamine structure, m is a whole number from 0 to 1, with m being zero only when the aforesaid grouping is alicyclic and x is a whole number in excess of 1.

2. A polymeric composition composed of recurring units of the formula

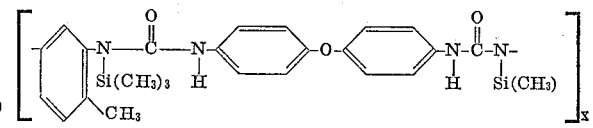

where x is a whole number in excess of 1.

3. A polymeric composition composed of recurring units of the formula

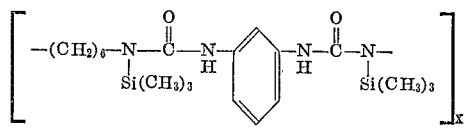

where x is a whole number in excess of 1.

4. A polymeric composition composed of recurring units of the formula

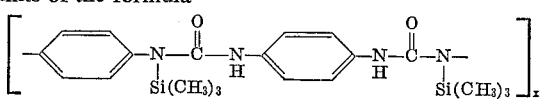

where x is a whole number in excess of 1.

5. A polymeric composition composed of recurring units of the formula

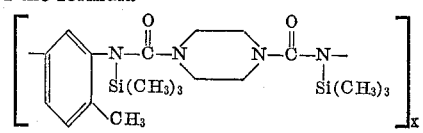

where x is a whole number in excess of 1.

6. The process for making polysilylureas which comprises effecting reaction between (1) an isocyanate compound of the formula

OCN—R—NCO with (2) a triorganosilyl amine of the formula

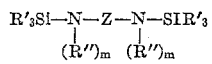

where R is a divalent organic radical, R' is a monovalent hydrocarbon radical, R" is a member selected from the class consisting of hydrogen and monovalent hydrocarbon radicals, and the grouping

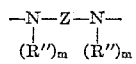

is a divalent organic radical selected from the class consisting of (a) organic radicals terminated by the two nitrogen atoms with Z being a divalent organic moiety, and (b) alicyclic radicals where Z with the two nitrogens forms a cyclic diamine structure, and m is a whole number from 0 to 1, m being zero only when the aforesaid grouping is alicyclic.

7. The process as in claim 6 in which the isocyanato compound is toluene-2,4-diisocyanate and the triorganosilyl amine is N,N'-bis(trimethylsilyl)-p,p'-diaminodiphenyl ether.

8. The process as in claim 6 in which the isocyanato compound is hexamethylene diisocyanate and the triorganosilyl amine is N,N'-bis(trimethylsilyl)-p,p'-diaminodiphenyl ether.

9. The process as in claim 6 in which the isocyanato compound is para-phenylene diisocyanate and the triorganosilyl amine is N,N'-bis(trimethylsilyl)-p-phenylenediamine.

10. The process as in claim 6 in which the isocyanato compound is toluene diisocyanate and the triorganosilyl amine is N,N'-bis(trimethylsilyl)-p-phenylenediamine.

11. The process as in claim 6 in which the isocyanato compound is toluene-2,4-diisocyanate and the triorganosilyl amine is N,N'-bis(trimethylsilyl) piperazine.

12. A composition of matter having the formula

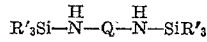

where R' is a monovalent hydrocarbon radical and Q is a divalent aryl radical selected from the class consisting of phenylene, xenyl, diphenylene oxide, and diphenylene alkanes of the formula

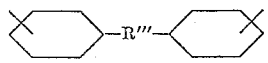

where R''' is a divalent alkyl radical.

13. The compound N,N'-bis(trimethylsilyl)-p,p'-diaminodiphenyl ether having the formula

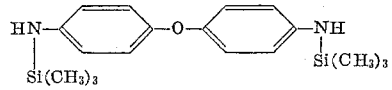

14. The compound N,N'-bis(trimethylsilyl)-m-phenylenediamine having the formula

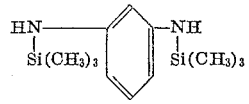

15. The compound N,N'-bis(trimethylsilyl)-p-phenylene diamine having the formula

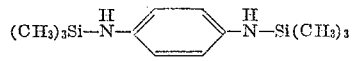

16. The compound N,N'-bis(trimethylsilyl)-p,p'-diaminodiphenyl having the formula

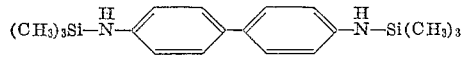

17. The compound N,N'-bis(trimethylsilyl)-p,p'-diaminodiphenyl methane having the formula

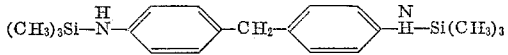

References Cited by the Examiner

UNITED STATES PATENTS 2,907,782   10/59   Pike _____ 260—46.5

OTHER REFERENCES

Journal of Organic Chemistry, vol. 25, pp. 1804–6, October 1960.

Journal of American Chemical Society, vol. 82, pp. 5625–8, Nov. 5, 1960.

Die Makromolekulare Chemie, vol. 32, pp. 218–25, 1959.

LEON J. BERCOVITZ, *Primary Examiner.*